(No Model.) 2 Sheets—Sheet 1.
A. C. PATTEE.
DEVICE FOR HOLDING CATTLE WHILE BEING DEHORNED.
No. 408,257. Patented Aug. 6, 1889.
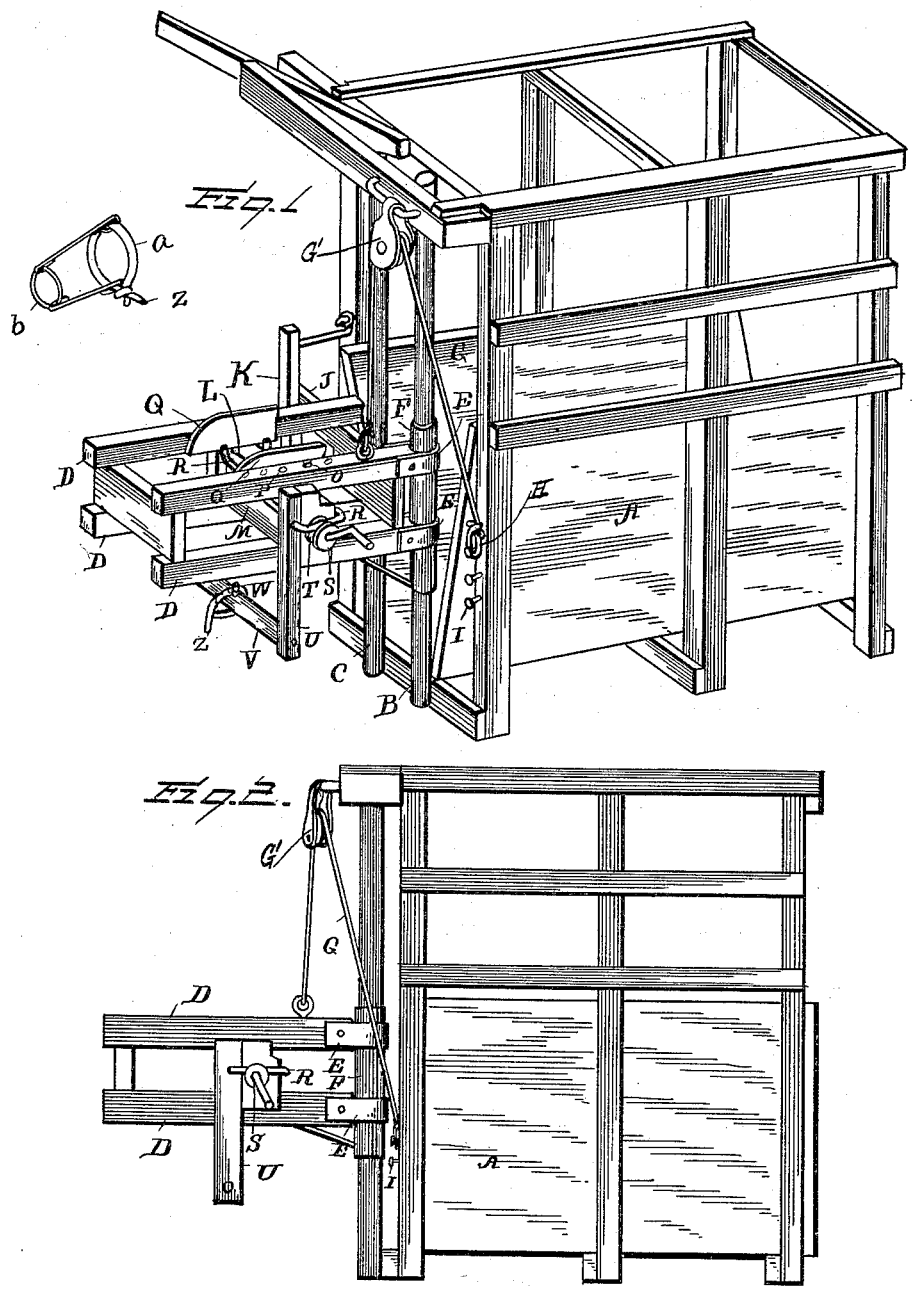
Witnesses
E. C. Kurdeman
R. W. Bishop.
Inventor
A. C. Pattee
By his Attorneys

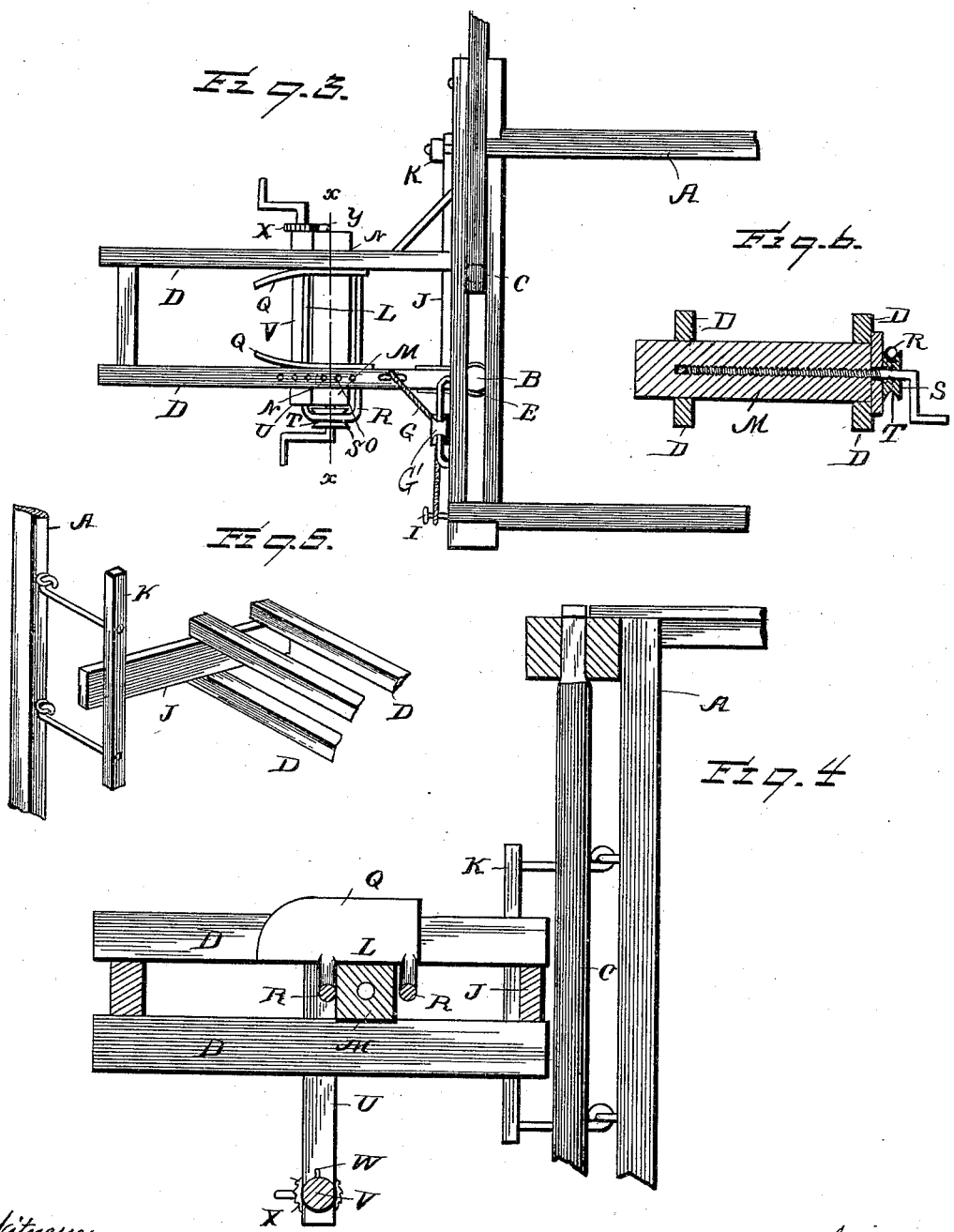

UNITED STATES PATENT OFFICE.

ALBERT C. PATTEE, OF BROOKVILLE, KANSAS.

DEVICE FOR HOLDING CATTLE WHILE BEING DEHORNED.

SPECIFICATION forming part of Letters Patent No. 408,257, dated August 6, 1889.

Application filed May 2, 1889. Serial No. 309,376. (No model.)

*To all whom it may concern:*

Be it known that I, ALBERT C. PATTEE, a citizen of the United States, residing at Brookville, in the county of Saline and State of Kansas, have invented a new and useful Machine for Holding Cattle while being Dehorned, of which the following is a specification.

My invention relates to improvements in machines for holding cattle while being dehorned; and it consists in certain novel features hereinafter described and claimed.

In the accompanying drawings, Figure 1 is a perspective view of a machine constructed in accordance with my invention. Fig. 2 is a side view of the same. Fig. 3 is a plan view, and Fig. 4 is a vertical section. Fig. 5 is a detail perspective view of the latch. Fig. 6 is a vertical transverse section on the line $x$ $x$ of Fig. 3.

In the drawings I have shown my improved machine as applied to a pen A, having the stanchion-bars B C at its front end; but this arrangement is not an essential feature of my invention, and my improvements can be applied to an ordinary stall or a common stanchion. The stationary stanchion-bar is made cylindrical so as to serve as a hinge-post, and my improved apparatus is mounted thereon so as to swing freely in a horizontal plane.

My improved device comprises the longitudinal bars D D, which are arranged in pairs, as shown, and one pair of these bars is provided with the rearwardly-projecting hinge-loops E, which encircle the cylindrical stanchion-bar or hinge-post, as shown, and are secured to a sleeve F, mounted loosely on the hinge-post, so as to move vertically thereon, and at the same time allow my improved device to swing horizontally. The apparatus is maintained at the proper height by means of a rope G secured to the upper bar D, and passing upward therefrom over a pulley G', suitably mounted above the apparatus, and then extending downward, and provided with a loop H, adapted to engage over one of a series of pins I projecting from the frame of the pen or from the side of the stall, as will be readily understood. At its inner or hinged end the swinging frame is provided with a laterally-projecting arm J, which is adapted to be engaged by a bail K, mounted on the frame of the pen or the side of the stall, so as to hold the swinging frame in proper position to support the head of the animal while being operated on.

The head-rest L is supported by the longitudinal bars D, and moves along the same, so as to bring the head-rest into proper position to support the head according to the length of the same, as will be readily understood. The said head-rest consists of a cross-bar M, having notches N in its upper and lower sides which engage the longitudinal bars D, so as to prevent the said cross-bar slipping laterally from the said bars D, and the said cross-bar is held at any desired point of the bars D by means of a pin O inserted through one of a series of perforations P in the said bars D, so as to engage the cross-bar M, as will be readily understood on reference to the drawings.

On the upper side of the head-rest L, I secure the cheek-supports Q, one of which is rigidly secured on the head-rest and the other one is supported thereon by means of a carrier R, mounted on the head-rest, and having its inner end secured to the cheek-support and its outer end engaged by an adjusting-screw S, so that it can be moved along the head-rest to clamp the head between the two cheek-supports. This adjusting-screw S is mounted in suitable stationary bearings within the head-rest, and is provided at its outer end with an annular groove T, which engages the outer end of the carrier, so that as the screw is rotated the carrier will be moved longitudinally of the head-rest, as will be readily understood.

To the ends of the head-rest I secure the hangers U, which depend therefrom below the bars D and have a windlass V mounted in their lower ends, the said windlass having a radial pin or stud W, and being provided at one end with a ratchet-disk X, which is engaged by a pawl Y, pivoted on the hanger above the said ratchet-disk. A halter or securing-rope Z is provided having a long loop $a$ at one end, which is adapted to pass over the head of the animal and then downward to the windlass and be engaged by the radial pin or stud W thereon, and this securing-rope is provided with a nose-band $b$, which is adapted to pass over the nose of the animal in the operation of the machine.

In practice, when it is desired to use my improved machine, the animal is driven through the pen or the stall and its head secured by the stanchion-bars in the usual manner. The securing-rope is then passed around the neck of the animal behind the ears, with the nose-band passing across his nose, and the loop in the rope is engaged over the radial pin of the windlass, the head being thereby drawn down to the jaw-clamp. The swinging frame is then adjusted to the proper height to support the head, after which the head-rest is adjusted outward, so as to bring the cheek-supports into proper position to clamp the head between them. The adjusting-screw is then rotated so as to bring the movable cheek-support against the head of the animal, and thereby clamp the same, after which the windlass is rotated so as to draw the rope taut and hold the head of the animal in the lowered position, so that he cannot move until released. The horns are then removed in the usual manner, as will be readily understood.

From the foregoing description, taken in connection with the accompanying drawings, it will be seen that I have provided a device which can be readily adjusted to the height of the animal, the length of the neck, and the width of the head easily and rapidly, so that it can be used to hold the head of any animal still while the horns are being removed, and its advantages are thought to be obvious.

Having thus described my invention, what I claim, and desire to secure by Letters Patent, is—

1. A machine for holding cattle while being dehorned, consisting of a fixed support and a head-supporting frame hinged thereto and adapted to swing in a horizontal frame, substantially as set forth.

2. A machine for holding cattle while being dehorned, consisting, essentially, of a vertically-adjustable horizontally-swinging frame and the head-rest adjustably supported on said frame, as set forth.

3. The combination, with a fixed support, of a horizontally-swinging frame mounted thereon and having a laterally-projecting arm, and a bail arranged at one side of the swinging frame and adapted to engage said lateral arm, as set forth.

4. The combination, with a fixed support, of a horizontally-swinging frame mounted thereon, a head-rest mounted on the said swinging frame and adapted to slide longitudinally thereon, and the cheek-supports mounted on the said head-rest, as set forth.

5. The combination, with a fixed support, of a horizontally-swinging frame, an adjustable head-rest mounted thereon, a stationary cheek-support secured on the head-rest, a carrier mounted on the head-rest, a movable cheek-support secured to said carrier, and means for moving the carrier, as set forth.

6. The combination, with a fixed support, of a horizontally-swinging frame, a head-rest adjustably mounted on said swinging frame, hangers depending from the head-rest, a windlass mounted in said hangers and provided with a radial pin, and a securing-rope having a long loop at one end adapted to pass over the neck of the animal and engage the said radial pin and provided with a nose-band, as set forth.

In testimony that I claim the foregoing as my own I have hereto affixed my signature in presence of two witnesses.

ALBERT C. PATTEE.

Witnesses:
F. CABLE,
R. C. WARNER.